Sept. 2, 1952 L. F. FALKENSTEIN 2,609,526
COURSE OR CONDITION MAINTENANCE
Filed Feb. 10, 1948
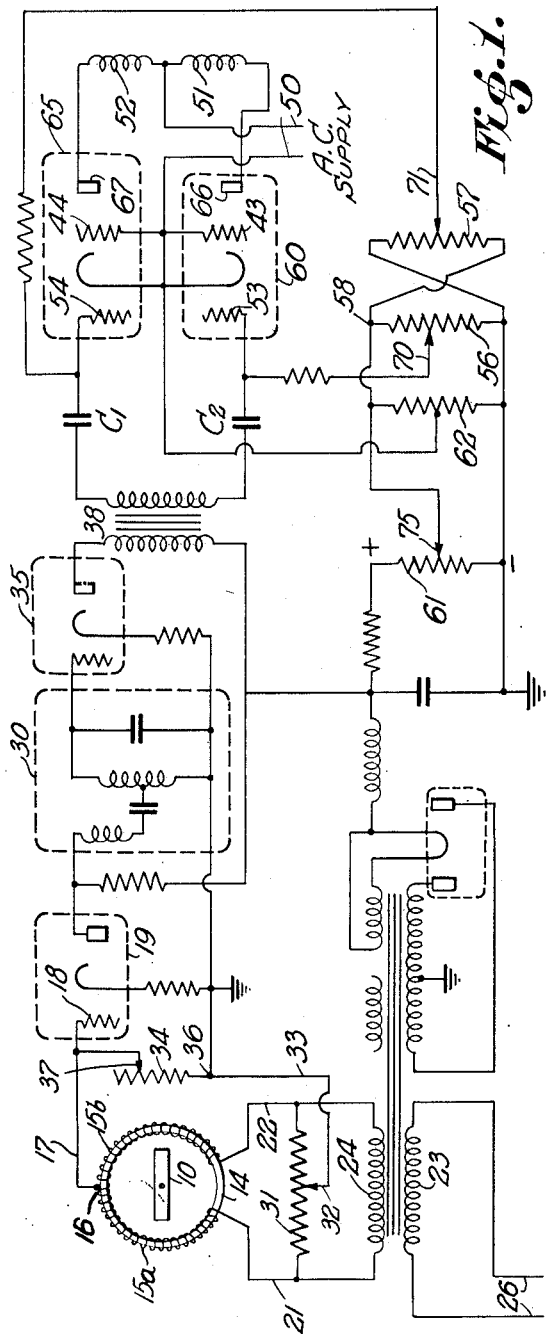
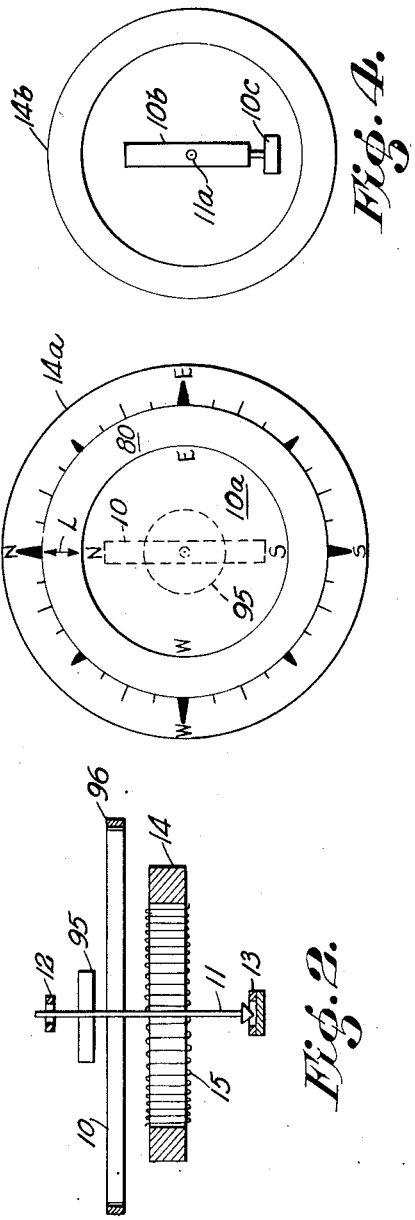
INVENTOR:
LOUIS F. FALKENSTEIN,
BY Martin J. Finnegan
ATTORNEY Patented Sept. 2, 1952

2,609,526

UNITED STATES PATENT OFFICE 2,609,526

COURSE OR CONDITION MAINTENANCE

Louis F. Falkenstein, Franklin Square, N. Y.

Application February 10, 1948, Serial No. 7,501

11 Claims. (Cl. 318—489)

1

This invention relates to orientation, and particularly to the automatic maintenance of a selected course or condition.

An object of the invention is to provide a novel electronic system, with magnetic flux control, for the maintenance of a selected course or condition, as pre-set on a magnetic compass, for example.

Another object is to provide novel magnetically controlled electronic means for controlling the energization of a power mechanism, which power mechanism may be a rudder or other steering gear, or it may be any other device for performing a restoring operation upon an object whose deviation from normal condition can also be indicated by said magnetic means.

Other objects and features of the invention will be apparent upon reading of the following description of the invention as illustrated in the accompanying drawing, wherein:

Fig. 1 is a schematic lay-out of the system, indicating all electrical connections;

Fig. 2 is a schematic view of the magnetic controller;

Fig. 3 is another schematic view of the magnetic controller; and

Fig. 4 shows a modified magnet assembly for use in correcting deviations of a craft other than course deviations—that is, deviations from the horizontal plane.

Referring to Figs. 1, 2 and 3, the magnetic assembly includes a horizontal bar magnet 10 carried on a vertically disposed spindle 11 supported at its lower end in bearings 13, and controlled at its upper end by bearings 12; also a stationary toroidal core 14 whose diameter, as shown, is somewhat less than the length of magnet 10; such an arrangement being of maximum torque efficiency. Core 14 carries a winding 15 extending all the way around the core; the central point 16 of the winding being tapped by a lead 17 running by way of resistor 34 and tap 37 to grid 18 of a triode 19 constituting the first stage of the electronic assembly controlling the application of power to a steering control mechanism or other device for correcting a deviation from normal course or condition. This central tap 16 thus divides coil 15 into two equal sections 15a and 15b connecting by leads 21 and 22, respectively, to the opposite ends of the secondary winding 24 of a transformer whose primary winding 23 is energized from a suitable source 26 of alternating current.

In shunt relationship to the two winding sections 15a and 15b is an impedance or resistance unit 31, with adjustable tap 32 connecting by lead

2

33 to ground, as does also the cathode return of tube 19, the impedance or resistance 34, and the variable tap 37 leading to grid 18 of tube 19. With magnet 10 in the relationship (to windings 15a, 15b) shown in Fig. 1, and tap 32 at the central point of impedance 31, the potentials at points 36 and 37 are equal because the even harmonic (half cycle) voltages induced in the equally balanced circuit sections 15a, 15d and 31a, 31b are in constant opposition and thus cancel each other, so that no current flows in lines 17 and 33 and there is therefore no voltage applied to grid 18 of tube 19. Upon deviation of the craft from its course, windings 15a and 15b (being on the stator core 14 and therefore shiftable with the longitudinal axis of the craft) change their position in relation to bar magnet 10, which always stays in line with the earth's magnetic field and in this respect is comparable to magnet 39 (Fig. 2) as illustrated and described in U. S. Patent to Bechberger, No. 2,342,637 of February 29, 1944. The result is to establish a potential difference between points 36 and 37 (in one direction or the other, depending on whether the craft veers to the left or right of its pre-set course). Thereupon tube 19 amplifies this signal and passes it through filter network 30, amplifier tube 35, transformer 38, and coupling condensers $C_1$ and $C_2$, to the grids of thyratrons 60 and 65. This causes a corresponding flow of current from A. C. source 50 to one or the other of a pair of course restoring agencies 51, 52 for initiating a shift of the rudder or other restoring unit. If the signal voltage at tube 19 is in phase with A. C. supply 50, the anode 66 of thyratron 60 will function, but if 180 degrees out of phase, anode 67 will function. Thus is obtained a selective operation of either the unit 51 or 52, depending upon the direction of relative rotation, as between elements 10 and 14.

The thyratrons 60 and 65 have their grids 53, 54 wired to the opposite sides 56, 57, respectively, of a follow-up unit having terminals 58, 59 connecting with the instantaneous negative polarity side of source 50 by way of ratio control resistor 61 and center-tapped resistor 62.

Assuming that the direction of unbalance is such as to cause current flow to unit 51, the resultant shifting of the rudder will move arm 70 of the follow-up device and thus produce a gradual increase in the negative voltage bias on grid 53. This increase will continue until the voltage on this grid will not allow the thyratron to pass any more current to unit 51. At the same time the signal voltage on grid 54 of thyratron 65 has been negative by the same amount as the positive signal on grid 53. And the follow up voltage from tap 71 has increased in a positive direction to exactly balance this signal voltage to the zero voltage point.

The rudder has now been moved through an angle proportional to the number of degrees the craft had deviated from pre-set course. The rudder will maintain this new position until the craft (sea or aircraft) starts to return to the preset course. The action then takes place in the opposite direction. That is, as windings 15a, 15b return toward their original position in relation to magnet 10, the opposite thyratron (65) is caused to pass current to unit 52, thus causing the rudder to move in the opposite direction, or back toward the original (amidships) position. At the same time the compensating unbalance voltage on the grids 53, 54 is being reduced. Eventually a point is reached wherein the rudder is amidships (ship on course), the windings 15a, 15b are in such relation to magnet 10 as to apply no voltage to tube 19, and the follow-up voltages on the two thyratron grids 53, 54 are equal to zero.

If it is desired to vary the sensitivity of the control so as to prevent undue operation as in rough weather, it is only necessary to vary the gain of the amplifier by any suitable method, such as changing the position of arm 37 on resistor 34.

If it is desired to vary the degree of lag as between commencement of the restoring function and commencement of the follow-up action, it is only necessary to adjust the "lost motion" mechanical connections between each arm 70, 71 and the body being restored.

If it is desired to vary the ratio between degrees of body movement and degree of follow-up movement of arms 70, 71, it is only necessary to shift the position of the arm 75 on the ratio control potentiometer 61.

The toroidal core 14, in addition to carrying the windings 15a, 15b, also carries a compass scale, as shown at 14a in Fig. 3. The conventional compass card, attached to bar magnet 10, is indicated at 10a in Fig. 3. It will be understood that the desired course is initially set by turning scale 14a and core 14 until the desired compass reading is opposite the lubber mark "L" on the compass ring 80, the latter being fixed to the compass base or frame. When thus positioned, core 14 is locked in position.

The same electronic system and a magnet controlled toroidal coil may be employed to maintain the craft on an even keel, that is, to correct for deviation from the horizontal plane. All that need be added is a weight, as shown at 10c in Fig. 4, to make the bar magnet 10b pendulous about its axis (11a) of suspension; the latter being disposed horizontally, instead of vertically as in Fig. 2. In this arrangement the toroidal core (shown at 14b in Fig. 4) will be in a vertical, rather than a horizontal plane, and will respond to either "roll" or "pitch" tendencies, depending upon whether said vertical plane coincides with the longitudinal or the transverse axis of the craft. Two such coils and systems are required to compensate for all possible horizontal deviations.

Should the weight of shaft 11 (Fig. 2) be troublesome, this can be off-set by immersing magnet 10 within a float chamber, with a float element 95, corresponding to the conventional compass float, except that the vanes normally employed thereon, for damping purposes, are preferably omitted, and instead there is substituted a conductive ring 96 fitting closely around but not touching magnet 10, and tending to set up a generator action, causing eddy currents which operate to damp the vibrational forces. Such a novel arrangement is superior to the vane type of damper, as it creates no "precessing" or pulling tendency, as do liquid-actuated vanes.

The claims appended hereto are comparable to the claims of my co-pending application No. 727,378 of February 8, 1947, with variations to fit the novel features of the present disclosure.

I claim:

1. In a control system, a pair of operating circuits for initiation of a work function, said operating circuits including a tube having cathodes, anodes, control grids, and auxiliary grids, each of said operating circuits also including one of said anodes, magnetic flux means normally maintaining said control grids at equal potential to prevent activation of said tube, means responsive to creation of a potential difference at said control grids to initiate the work cycle by way of one of said operating circuits, and means synchronized with said work cycle to continuously vary the potential at said auxiliary grids and thereby control said work cycle, said equal potential maintaining means including a second vacuum tube having a cathode, anode, and control grid, and balanced magnetized coil sections connected to said control grid.

2. Apparatus as in claim 1, wherein the equal potential maintaining means includes a pair of coil sections of equal length, and normally balanced means controlling operation of said coil sections.

3. Apparatus as in claim 1, wherein the equal potential maintaining means includes a pair of coil sections of equal length, and normally balanced means controlling operation of said coil sections, said last-named means being unbalanced during said work cycle, and automatically re-balanced at the completion thereof.

4. Means for restoring a body to a pre-selected course or condition, following deviation therefrom, said means comprising an electronic amplifier and a single magnetic couple for controlling the operation of said amplifier, said single magnetic couple consisting of a magnetic element and a toroidal coil in concentric relationship, said coil being divided into two sections of equal length, means for energizing said two coil sections to equal degrees so long as said body remains in its pre-selected state, and uni-directional magnetic means for unbalancing the two coil sections to cause restoring energy to be applied to said body, when deviation occurs.

5. Means for restoring a body to a pre-selected course or condition, following deviation therefrom in either direction, said means comprising an annular core and a single coil of wire wound about said core and divided into two sections of equal length and additive magnetic effect upon said core, deviation responsive means for causing a restoration controlling force to be applied over said two coil sections, and means for amplifying said force in proportion to the degree and rate of deviation.

6. In apparatus of the class described, a restoring motor, a pair of directional controls for said motor, a follow-up device, magnetic flux means for energizing one or the other of said directional controls, said energizing means including a single winding, consisting of two equal sections magnetically additive and normally in magnetic balance, and also including a tube circuit responsive to unbalancing of said sections to operate said directional controls, said circuit being of variable intensity proportional to the restoring work required of said motor, and means including said follow-up device for determining the deviation of each period of operation of said energizing means.

7. In apparatus of the class described, a restoring motor, a follow-up device, a source of energy of substantially constant frequency, a single magnetic flux means energized by said source, a pair of normally balanced circuits interspersed between said magnetic flux means and said restoring motor, means responsive to any uni-directional magnetic disturbance of said normally balanced circuits a voltage differential of an intensity which is variable in proportion to the restoring work required of said motor, and means including said follow-up device for determining the duration of operation of said energizing means.

8. In apparatus of the class described, a restoring motor, a follow-up device, magnetic flux means including a core having a single winding consisting of two equal sections of additive magnetic effect on said core, and normally in magnetic balance, uni-directional means responsive to unbalancing of said sections for energizing said motor to a degree proportional to the restoring work required of said motor, and means including said follow-up device for determining the duration of each period of operation of said energizing means.

9. Automatic steering means for a course-following body comprising a toroidal ring fixed to the body to be directed, a single coil divided into a pair of equal coil sections wound about said ring, a magnet adjacent said ring, a spindle carrying said magnet, and means for rotatably supporting and guiding said spindle at its lower and upper ends, respectively, and means responsive to a potential variation produced in said coil sections by relative motion between said ring and spindle to cause a course-correcting force to be applied to said body.

10. In a directing compass, a ring, a centrally tapped coil wound about said ring, a magnet adjacent said ring, a spindle carrying said magnet, means for rotatably supporting and guiding said spindle at its lower and upper ends, respectively, means for supplying energizing current to said coil, and means responsive to a potential variation produced in said coil by relative motion between said ring and spindle to cause a counteracting force application tending to restore the original relationship between said ring and spindle.

11. A directing compass as defined in claim 10, including a conductive ring distinct from said first-named ring, and cooperating with said magnet to produce eddy currents tending to damp the vibrational forces affecting said compass.

LOUIS F. FALKENSTEIN.

REFERENCES CITED

The following references are of record in the file of this patent:

UNITED STATES PATENTS

| Number | Name | Date |
|---|---|---|
| 2,330,661 | Arey et al. | Sept. 28, 1943 |
| 2,334,704 | Hilferty | Nov. 23, 1943 |
| 2,342,637 | Berchberger | Feb. 29, 1944 |
| 2,371,415 | Tolson | Mar. 13, 1945 |
| 2,387,795 | Isserstedt | Oct. 30, 1945 |
| 2,407,536 | Chapman | Sept. 10, 1946 |
| 2,415,430 | Frische et al. | Feb. 11, 1947 |
| 2,416,097 | Hansen et al. | Feb. 18, 1947 |
| 2,415,819 | Halpert et al. | Feb. 18, 1947 |
| 2,432,036 | Noxon | Dec. 2, 1947 |
| 2,451,263 | Webb | Oct. 12, 1948 |